Patented Feb. 25, 1941

2,233,072

UNITED STATES PATENT OFFICE 2,233,072

PREPARATION OF ACETOACETIC ESTERS OF PHENOLS

Albert B. Boese, Jr., Pittsburgh, Pa., assignor to Carbide and Carbon Chemicals Corporation, a corporation of New York No Drawing. Application May 9, 1936,
Serial No. 78,852

11 Claims. (Cl. 260—479)

The present invention relates to aromatic acetoacetates; and more especially it concerns the production of these acetoacetates by the regulated reaction of diketene and a corresponding monohydric phenol or homologue thereof.

The disclosure previously has been made by Staudinger in the monograph "Die Ketena," page 41, that diketene reacts with phenols to yield acetoacetic esters. Moreover Wiezevich and Gleason state in U. S. Patent No. 1,998,404 that phenol acetoacetate has been prepared from diketene and phenol. In neither case, however, are any experimental details given, nor are the products described. Furthermore, no acetoacetic esters of phenols are described in the literature to date, as far as I am aware.

When diketene is reacted with phenol under the conditions usually recommended for the preparation of alkyl acetoacetates, the expected esterification does not occur but, instead, the diketene polymerizes largely to dehydracetic acid.

The present invention is based upon the discovery that the acetoacetic esters of the phenols and phenol homologues may be prepared in satisfactory yields by reacting diketene and the corresponding phenol or phenol homologue under conditions where the diketene is added at a slow rate to and quickly mixed with a solution of the phenol in a dry, medium-boiling or relatively high-boiling solvent which is inert with respect to the reactants, examples of which solvents are named hereinafter. Apparently this slow addition of the diketene prevents the concentration in the mixture of unreacted diketene in amount sufficient to facilitate or cause substantial polymerization thereof.

It is desirable to conduct the reaction between the diketene and the phenol or its equivalent— in at least the initial stages of the reaction— while maintaining the reactants substantially out of contact with metal surfaces or other materials catalyzing the polymerization of the diketene.

Since high temperatures favor the esterification, it is desirable that the reaction be conducted at the refluxing temperature of a dry, medium-boiling or fairly high-boiling inert solvent boiling within the range of from about 100° to 150° C., such as xylene, toluene, butyl ether, dioxan, ethyl benzene, and the higher ketones such as dipropyl ketone, methylisobutyl ketone, and methyl amyl ketone.

It is desirable to react the diketene and the monohydric phenol or homologue in the presence of a small amount of an esterification catalyst, such as sulfuric acid, hydrochloric acid, or other mineral acid, or an acid salt such as sodium acid sulfate.

It is important, in order to secure high yields of the acetoacetates, that the reactants be anhydrous, so as to prevent hydrolysis of the diketene. Likewise the diketene should be as free as possible from acetic anhydride. The presence of the latter causes low yields of the acetoacetates, since apparently it reacts with phenol to form phenyl acetate and acetic acid, the latter of which then is dehydrated to acetic anhydride by the diketene, which in turn breaks down to acetone, carbon dioxide, and acetic acid.

The following examples serve to illustrate the invention, although the specific conditions recited therein may be substantially departed from, within the scope of the invention.

Example 1

Diketene was purified by distillation under vacuum through a two-foot helix-packed column. The purified diketene boiled at 50° C. under 46 mm. of mercury absolute pressure.

To a solution of 94 grams of phenol in 150 cc. of refluxing dry xylene containing 0.1 gram of sulfuric acid, there was slowly added with stirring a solution of 84 grams of the said purified diketene (melting point —8° C.) in 75 cc. of dry xylene. After the diketene had all been added, the reaction mixture was refluxed for one hour more. The solution, which had darkened, was fractionally distilled through the above-mentioned column. The xylene which distilled off contained an appreciable amount of unchanged diketene. At 60° to 70° C. under a pressure of 2 mm. of mercury, absolute, 20 grams of unchanged phenol distilled off. At between 128° and 130° C. under 2 mm. of mercury, absolute pressure, 113 grams of phenyl acetoacetate distilled, and was separately condensed and recovered. The yield thereof amounted to 63.5% based upon the diketene employed. A small non-distillable residue remained. Phenyl acetoacetate is a slightly yellow, somewhat viscous liquid having a slight phenol odor.

The acetoacetic esters of the phenols and homologues of the phenols have properties which may render them valuable as dyestuff intermediates, and as intermediates for the preparation of alkyl coumarins such as the methyl coumarins.

Among aromatic hydroxy compounds which react with diketene to produce aromatic acetoacetates within the scope of the invention also may be mentioned the cresols, xylenols, ethyl phenols, and other monohydric phenol homologues.

Example 2

To a refluxing solution of 17 grams of para cresol in 100 cc. of ethyl benzene containing 0.1 gram of sulfuric acid was added slowly 13 grams of purified diketene (melting point −8° C.). After addition of the diketene, the refluxing was continued for another hour. The resultant solution was fractionally distilled under vacuum. The fraction boiling between 145° and 148° C. under 1.5 mm. of mercury absolute pressure was separately condensed, yielding 13 grams of para-cresyl acetoacetate, corresponding to a yield of about 43.3%.

Para-cresyl acetoacetate is a water-insoluble, somewhat viscous, colorless liquid, having a slight cresol odor, and the structure represented by the formula:

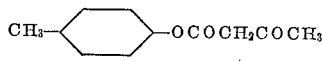

The term "a phenol" is employed in this specification and claims to designate a phenol or a phenol homologue having one hydroxyl group directly attached to the benzene nucleus.

The invention is susceptible of modification within the scope of the appended claims.

I claim:

1. Process for making an acetoacetate of a phenol, which comprises introducing diketene at a slow regulated rate into an agitated hot body of a solution of the said phenol in a solvent therefor inert to the reactants, the said solution being maintained at a refluxing temperature.

2. Process for making an acetoacetate of a phenol, which comprises introducing diketene at a slow regulated rate into an agitated hot body of a solution of the said phenol in a solvent therefor inert to the reactants, the said solution being maintained at a refluxing temperature under conditions retarding polymerization of the diketene.

3. Process for making an acetoacetate of a phenol, which comprises introducing diketene at a slow regulated rate into an agitated hot body of a solution of the said phenol in a solvent therefor inert to the reactants, the said solution being maintained at a refluxing temperature, in the presence of an esterification catalyst.

4. Process for making an acetoacetate of a phenol, which comprises slowly bringing into intimate intermixture, at a temperature within the range from around 100° to around 150° C., diketene and a hot refluxing body of a solution of a phenol in a volatile solvent inert toward diketene and said phenol, under conditions retarding polymerization of the diketene, one of the reagents being added to the other in small regulated amounts, and separately recovering from the resultant reaction mixture the acetoacetate of the phenol thus produced.

5. Process as defined in claim 4, according to which the diketene and the said phenol are anhydrous, and the diketene is substantially free from acetic anhydride.

6. Process for making an acetoacetate of a phenol, which comprises introducing diketene at a slow regulated rate into an agitated solution of the said phenol in an inert medium- or high-boiling volatile solvent at the refluxing temperature of the said solvent in the presence of an esterification catalyst, fractionally distilling the resultant reaction mixture containing the acetoacetate of the said phenol, and separately condensing and recovering a fraction containing the said acetoacetate.

7. Process for making an acetoacetate of a phenol, which comprises slowly introducing a water-free solution of diketene in an inert volatile solvent into a solution of the said phenol in an inert medium- or high-boiling volatile solvent at the refluxing temperature of the said solvent in the presence of an esterification catalyst, fractionally distilling the resultant reaction mixture containing the acetoacetate of the said phenol, and separately condensing and recovering a fraction containing the said acetoacetate.

8. Process for making an acetoacetate of a phenol, which comprises slowly introducing anhydrous diketene substantially free from acetic anhydride into a solution in an inert volatile solvent of a phenol at the refluxing temperature of the last-named solution, in the presence of an esterification catalyst, thereby forming an acetoacetate of the said phenol, fractionally distilling the resultant reaction mixture, and separately condensing and recovering the said acetoacetate.

9. Process for making an acetoacetate of a phenol, which comprises slowly introducing an anhydrous solution of diketene substantially free from acetic anhydride in an inert medium- or high-boiling solvent for diketene into a solution of said phenol in an inert medium- or high-boiling volatile solvent at the refluxing temperature of the said solvent, in the presence of an esterification catalyst, fractionally distilling the resultant reaction mixture containing the acetoacetate of the said phenol, and separately condensing and recovering a fraction containing the said acetoacetate.

10. Process for making phenyl acetoacetate, which comprises slowly introducing anhydrous, acetic anhydride-free diketene into a refluxing solution of phenol in a medium- or high-boiling inert volatile solvent, in the presence of an esterification catalyst, thereby forming phenyl acetoacetate while retarding the polymerization of the diketene, fractionally distilling the resultant reaction mixture, and separately recovering the fraction distilling at from 128° to 130° C. under 2 mm. of mercury absolute pressure, containing the phenyl acetoacetate.

11. Process for making para-cresyl acetoacetate, which comprises slowly introducing successive small portions of diketene into a heated agitated solution of para-cresol in a medium- or high-boiling volatile solvent inert to the reactants, in the presence of an esterification catalyst, fractionally distilling the resultant reaction mixture under vacuum, and separately recovering the fraction distilling between 145° and 148° C. under 1.5 mm. of mercury absolute pressure, containing the para-cresyl acetoacetate.

ALBERT B. BOESE, JR.